United States Patent [19]

Okuda et al.

[11] Patent Number: 4,503,129
[45] Date of Patent: Mar. 5, 1985

[54] SHIELDED METAL ARC WELDING ELECTRODE FOR CR-MO LOW ALLOY STEELS

[75] Inventors: Naoki Okuda, Kamakura; Akihiko Usui, Fujisawa; Shigeaki Yamamoto, Kanagawa; Shogo Natsume, Kamakura, all of Japan

[73] Assignee: Kabushiki Kaisha Kobe Seiko Sho, Kobe, Japan

[21] Appl. No.: 414,938

[22] Filed: Sep. 3, 1982

[30] Foreign Application Priority Data

Sep. 10, 1981 [JP] Japan .................. 56-143365

[51] Int. Cl.³ .................. B22F 7/04; B32B 15/02; B23K 35/34
[52] U.S. Cl. .................. 428/562; 75/123 B; 75/123 J; 75/123 K; 75/123 L; 75/124; 148/36; 148/37; 219/145.23; 219/146.23; 219/146.24; 219/146.3; 219/146.32; 428/563
[58] Field of Search ............... 219/145.23, 146.23, 219/146.32, 146.24, 146.3; 428/562, 563; 148/36, 37; 75/123, 124

[56] References Cited

U.S. PATENT DOCUMENTS 3,253,950  5/1966  Wasserman et al. .......... 428/562
3,645,782  2/1972  Johnson .................. 428/563

FOREIGN PATENT DOCUMENTS 4529365  9/1970  Japan ................ 219/146.23

Primary Examiner—Richard D. Lovering
Attorney, Agent, or Firm—Oblon, Fisher, Spivak, McClelland & Maier

[57] ABSTRACT

A shielded arc welding electrode containing in a core wire or a covering flux thereof alloy elements in the proportions satisfying the following conditions.

$$\{B_w \times [C(\%)]_w\} + \left(\frac{A_f}{1-A_f} \times B_f \times [C(\%)]_f\right) \leq 0.13\%$$

$$\{B_w \times [Mn(\%)]_w\} + \left(\frac{A_f}{1-A} \times B_f \times [Mn(\%)]_f\right) \leq 1.0\%$$

$$\{B_w \times [Si(\%)]_w\} + \left(\frac{A_f}{1-A} \times B_f \times [Si(\%)]_f\right) \leq 0.6\%$$

$$\{B_w \times [Cr(\%)]_w\} + \left(\frac{A_f}{1-A} \times B_f \times [Cr(\%)]_f\right) = 0.5\text{-}3.5\%$$

$$\{B_w \times [Mo(\%)]_w\} + \left(\frac{A_f}{1-A} \times B_f \times [Mo(\%)]_f\right) = 0.3\text{-}1.5\%$$

$$\{B_w \times [Al(\%)]_w\} + \left(\frac{A_f}{1-A} \times B_f \times [Al(\%)]_f\right) = 0.002\text{-}0.04\%$$

$$\{B_w \times [N(\%)]_w\} + \left(\frac{A_f}{1-A} \times B_f \times [N(\%)]_f\right) = 0.018\text{-}0.045\%$$

$$\{B_w \times [Ni(\%)]_w\} + \left(\frac{A_f}{1-A} \times B_f \times [Ni(\%)]_f\right) \leq 0.3\%$$

in which $B_w$ is a coefficient of yield in deposited metal of a wire-originating element, $B_f$ is a coefficient of yield in the deposited metal of a flux-originating element, [elementary symbol (%)]$_w$ is the percentage by weight of a component element of the core wire to the total weight thereof, [elementary symbol(%)]$_f$ is the percentage by weight of a component element of the flux to the total weight thereof, and $A_f$ is the flux ratio (the weight ratio of the applied flux to the total weight of the welding electrode).

7 Claims, 3 Drawing Figures

SHIELDED METAL ARC WELDING ELECTRODE FOR CR-MO LOW ALLOY STEELS

BACKGROUND OF THE INVENTION (1) Field of the Invention

This invention relates to a shielded metal arc welding electrode for Cr-Mo low alloy steels, which is capable of forming a weld with a high notch-toughness along with a low sensitivity to temper embrittling, and more particularly to a covered welding electrode which has Al and N positively added to one or both of its core wire and covering flux to obtain such a weld.

(2) Description of the Prior Art

Cr-Mo low alloy steels such as 1Cr-½Mo steel, 1¼Cr-½Mo steel, 2¼Cr-1Mo steel, 3Cr-1Mo steel and the like are widely applied industrially as a material of high heat resistance in the fields of boilers of high temperature and pressure, petroleum industry, synthetic chemistry or for uses requiring resistance to hydrogen of high temperature and pressure. Namely, Cr-Mo low alloy steels have been developed with a view to the improvements in high temperature strength and high temperature creep characteristics, so that it has been the general practice to put the utmost importance on the high temperature strength of the deposited metal in determining the weld designs of these materials. Meanwhile, the Cr-Mo low alloy steels have come to be used in severer environments, imposing higher criteria on other characteristics on various occasions. The first point is the improvement in low-temperature notch-toughness to cope with the increased use under cold climate, and the second point is the formation of a deposited metal of low sensitivity to temper embrittling which inevitably occurs, for example, to reactors which are used at high temperatures for a long time period of ten to twenty years.

SUMMARY OF THE INVENTION

With the foregoing situations in view, the present invention has been contrived according to the concept that, in order to satisfy the above-mentioned two points, it is necessary to improve the low-temperature notch-toughness in anticipation of the enhancement in the sensitivity to the temper embrittling, paying special attention to the composition of the deposited metal. From the standpoint that refinement of pre-austenite structure is a mandatory requisite for the improeovement of the low-temperature notch-toughness, we have studied and succeeded in the refinement by adding Al and N into the deposited metal. AlN could serve as cores in the stage of crystallization, and the greater the number of cores the finer become the crystal grains. Therefore, the existence of AlN ought to be confirmed by reductions in the size of crystal grains. It follows that the pre-austenite structure in the deposited metal can be made finer by adding a certain amount of An and N. Accordingly, the present invention has an especially significant importance to the Cr-Mo low alloy steels and is not intended for those steels which are free of the problem of temper embrittlement, for example, a steel with no or only a small Cr content like the 0.5Mo steel which is used at relatively lower temperatures, or a steel with a large Cr content which is immune from the temper embrittling even at high temperatures.

Namely, the present invention has as its object the provision of a covered welding electrode which can be effectively utilized to produce an effect of improving the low-temperature notch-toughness of Cr-Mo low alloy welds, and this effect is achieved by adding Al and N in the deposited metal in an amount sufficient for making the pre-austenite structure finer, thereby forming a weld which has low sensitivity to temper embrittling.

According to the present invention, there is provided a covered welding electrode which contains in a core wire or a convering flux thereof alloy elements which satisfies the following conditions.

$$\{B_w \times [C(\%)]_w\} + \left(\frac{A_f}{1-A_f} \times B_f \times [C(\%)]_f\right) \leq 0.13\%$$

$$\{B_w \times [Mn(\%)]_w\} + \left(\frac{A_f}{1-A_f} \times B_f \times [Mn(\%)]_f\right) \leq 1.0\%$$

$$\{B_w \times [Si(\%)]_w\} + \left(\frac{A_f}{1-A_f} \times B_f \times [Si(\%)]_f\right) \leq 0.6\%$$

$$\{B_w \times [Cr(\%)]_w\} + \left(\frac{A_f}{1-A_f} \times B_f \times [Cr(\%)]_f\right) = 0.5\text{-}3.5$$

$$\{B_w \times [Mo(\%)]_w\} + \left(\frac{A_f}{1-A_f} \times B_f \times [Mo(\%)]_f\right) = 0.3\text{-}1.5\%$$

$$\{B_w \times [Al(\%)]_w\} + \left(\frac{A_f}{1-A_f} \times B_f \times [Al(\%)]_f\right) = 0.002\text{-}0.04$$

$$\{B_w \times [N(\%)]_w\} + \left(\frac{A_f}{1-A_f} \times B_f \times [N(\%)]_f\right) = 0.018\text{-}0.045$$

$$\{B_w \times [Ni(\%)]_w\} + \left(\frac{A_f}{1-A_f} \times B_f \times [Ni(\%)]_f\right) \leq 0.3\%$$

in which $B_w$ is a coefficient of yield in the deposited metal of a wire-originating element, $B_f$ is a coefficient of yield in the deposited metal of a flux-originating element, [elementary symbol(%)]$_w$ is the percentage by weight of a component element of the core wire to the total weight thereof, [elementary symbol(%)]$_f$ is the percentage by weight of a component element of the flux to the total weight thereof, and $A_f$ is the flux ratio (weight ratio of the applied flux to the total weight of the welding electrode).

The above and other objects, features and advantages of the present invention will become apparent from the following description and the appended claims, taken in conjunction with the accompanying drawing.

DESCRIPTION OF PREFERRED EMBODIMENTS

Figure 1:
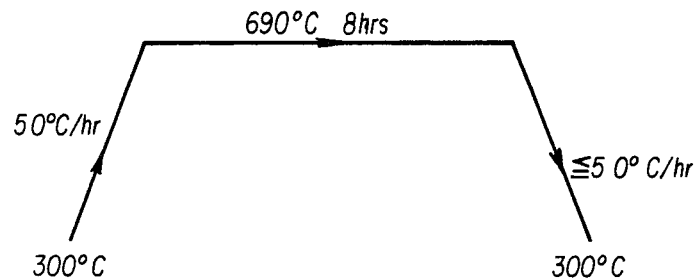
FIG. 1 is a heat pattern employed in a postweld heat treatment.

Firstly, it is to be noted that the percentages which appear in this specification are all percentages by weight unless otherwise specified.

The above-defined conditions of the elements to be added to the core wire and/or the flux are determined in consideration of the yields of the respective additive elements and the ratio of the covering flux which are suitable for attaining the fundamental objective of the present invention, namely, suitable for improving the low temperature notch-toughness of deposited metal in a welding stage of Cr-Mo low alloy steels. In the above-given conditional equations, the values of [elementary symbol(%)]$_w$ and [elementary symbol(%)]$_f$ are determined by the additive amount of the element to be blended into the core wire or flux. On the other hand, the value of A$_f$ which stands for the weight ratio of the covering flux is sepcified in the applying stage but, in the case of the shielded metal arc welding electrode of the present invention, it is selected from a range of 0.23 to 0.32. If A$_f$ is less than 0.23, the arc becomes unstable due to deficiency in the amount of the arc stabilizer and/or the slag shielding of the deposited metal becomes insufficient due to deficiency in the amount of the slag forming agent. On the contrary, if A$_f$ exceeds 0.32, it will cause excessive slag shielding of the deposited metal and irregularities in the bead appearance. Therefore, A$_f$ should be in the range of 0.23 to 0.32. With regard to the yield coefficients B$_w$ and B$_f$, their values vary depending upon the affinity with oxygen of the element concerned and are influenced by the flux composition (e.g., by the contents of the generally blended components such as the slag-forming agent, arc stabilizer, gas generating agent and the like). Therefore, although it is difficult to apply constant values to the respective component elements, Table 1 below shows the ranges of B$_w$ and B$_f$ which are generally applicable to the respective component elements.

TABLE 1

|    | B$_w$     | B$_f$     |
|----|-----------|-----------|
| C  | 0.5~1.0   | 0.1~0.8   |
| Mn | 0.2~0.8   | 0.3~0.8   |
| Si | 0.01~0.4  | 0.1~0.4   |
| Cr | 0.5~1.0   | 0.5~1.0   |
| Mo | 0.7~1.0   | 0.7~1.0   |
| Al | 0.02~0.3  | 0.01~0.1  |
| N  | 1.0~1.7   | 0.3~0.9   |
| Ni | 0.8~1.0   | 0.7~1.0   |

Under these circumstances, the final yields of the respective alloy elements are restricted to particular ranges by the above-given yield equations for the following reasons. [Yield of C≦0.13%]

The content of C is limited to 0.13% since the sensitivity to cracking of the deposited metal will be increased with a C-content in excess of 0.13%. [Yield of Mn≦1.0%]

The content of Mn is limited to 1.0% since an Mn content in excess of 1.0% will increase the sensitivity to temper embrittling. [Yield of Si≦0.6]

The content of Si is limited to 0.6% since a greater Si content will invite the same defect as C and Mn. [Yield of Cr=0.5–3.5%]

The lower limit of the Cr content is placed at 0.5% since a Cr content less than 0.5% will degrade the high temperature strength to a level comparable to that of C-Mo steel and cause deteriorations in oxidation resistance as well as in corrosion resistance. On the other hand, if it exceeds 3.5%, there will not occur any significant improvement in the temper embrittling during long use at high temperatures, failing to attain the technical effect which should be produced by the positive blending of Al and N. Therefore, the upper limit of the Cr content is placed at 3.5%. [Yield of Mo=0.3–1.5%]

The lower limit of the Mo yield is placed at 0.3 because a lower Mo content is insufficient for producing the expected effect of improving the high temperature strength. On the other hand, a Mo content in excess of 1.5% will result in defective notch toughness and enhancement of the sensitivity to temper embrittling. Accordingly, the upper limit is placed at 1.5%. [Yield of Al=0.002–0.04%]

It it is less than 0.002%, there will be no effective production of AlN, failing to make the pre-austenite structure finer and as a result lowering the notch-toughness and increasing the sensitivity to temper embrittling. The lower limit of the Al yield should therefore be placed at 0.002%. This refining effect is produced in a distinctive degree with an Al yield greater than 0.01%. However, if its yield exceeds 0.04%, excess Al remains after formation of AlN and oxidized into Al-oxides to lower the notch-toughness of the deposited metal. Therefore, the upper limit of Al is placed at 0.04%. [Yield of N=0.018–0.045%]

If the yield of N is less than 0.018%, AlN will be produced in an insufficient amount, giving rise to the same defect as in the case of Al. Therefore, the lower limit of N is placed at 0.018%. The yield of N in excess of 0.045, however, is not contained in the deposited metal and impairs the weldability or the usability. Thus, the upper limit is placed at 0.045%. [Yield of Ni≦0.3%]

The element Ni improves the notch touhgness but it yield should be limited to 0.3% since otherwise it will degrade the sensitivity to temper embrittling.

In order to satisfy the foregoing conditions of yield ranges of the elements C, Mn, Si, Cr, Mo, Al, N and Ni: the core wire is preferred to contain in percentage by weight C≦0.26, Mn≦5.0, Si≦12.0, Cr≦7.0, Mo≦2.1, Al≦2.0, N≦0.045, and Ni≦0.37; and the flux is preferred to contain C≦4.3, Mn≦11.1, Si≦20.0, Cr≦23.3, Mo≦7.1, Al≦13.4, N≦0.5, and Ni≦1.4.

In addition to the above-mentioned alloy elements, the core wire of the welding electrode according to the present invention contains iron and inevitable impurities. Of the impurity elements, P, Sb, Sn and As tend to diffuse and segregate in gumma grain boundaries of the pre-austenite structure. However, the gumma grain size could be minimized by the production of AlN, so that the concentration of the segregated impurities could be lowered, lessening the disadvantage of such segregation of impurities. Nevertheless, each content of P, Sb, Sn and As which as a whole impose an adverse effect on the temper embrittling sensitivity is desired to be <0.01%. Besides the above-mentioned alloy elements, the welding electrode of the present invention naturally contains in its covering flux a slag forming agent, arc stabilizer, gas generating agent and the like, which may be arbitrarily selected from known materials. In a case where it is desired to improve particularly the high temperature strength, at least one element selected from V, Nb, Ti and B may be added to the flux and/or core wire.

Thus, according to the present invention, it has become possible to improve the low-temprature notch-toughness after welding and to maintain low sensitivity to temper embrittling even during use at high temperatures over a long period of time.

The invention is illustrated more particularly by way of examples but they should not be construed as being restrictive of the technical sphere of the present invention.

EXAMPLES

Figure 2:
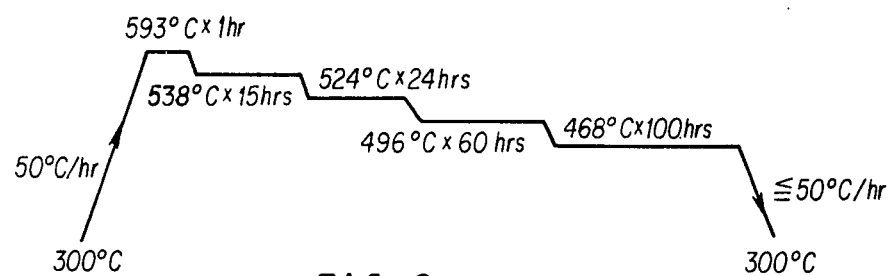
FIG. 2 is a heat pattern employed in a temper embrittling test.
Figure 3:
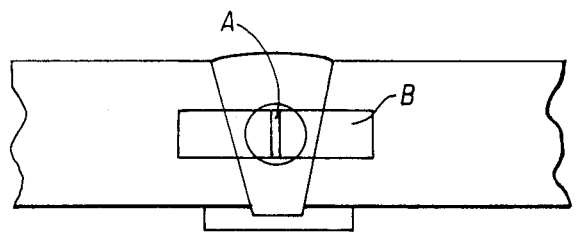
FIG. 3 is a diagrammatic illustration showing specimen sampling positions.

There were prepared core wires of the compositions shown in Table 2 and fluxes of the compositions shown at (a) and (b) of Table 3, obtaining shielded metal arc welding electrodes using various combinations of core wires and fluxes as shown in Table 4. These electrodes were used for shielded metal arc welding of works (see the foot note of Table 4) to obtain deposited metals shown in the same Table. Some of the deposited metals were subjected to postweld heat treatment (stress relief annealing) using a heat pattern of FIG. 1 while some were further subjected to an artificial temper embrittling heat treatment (step cooling), using a heat pattern of FIG. 2 for comparison in studying the effect of the present invention. The specimens for the tensile test and the Charpy impact tests were sampled from sections A and B of FIG. 3, respectively.

TABLE 2

| C. Wires | C | Mn | Si | Cr | Mo | Al | N | Ni |
|---|---|---|---|---|---|---|---|---|
| W-1 | 0.09 | 0.52 | 0.01 | 0.02 | 0.003 | 0.006 | 0.008 | 0.015 |
| W-2 | 0.07 | 0.42 | 0.20 | 1.31 | 0.54 | 0.003 | 0.006 | 0.10 |
| W-3 | 0.06 | 0.46 | 0.19 | 2.30 | 1.01 | 0.004 | 0.005 | 0.010 |
| W-4 | 0.07 | 0.45 | 0.19 | 2.32 | 1.05 | 0.08 | 0.015 | 0.15 |
| W-5 | 0.08 | 0.50 | 0.13 | 2.33 | 1.02 | 0.10 | 0.006 | 0.18 |
| W-6 | 0.11 | 0.55 | 0.10 | 2.30 | 1.04 | 0.08 | 0.020 | 0.18 |

N.B. The balance is Fe and inevitable impurities.

TABLE 3 (a)

| Fluxes | $CaCO_3 + MgCO_3 + BaCO_3$ | $CaF_2 + BaF_2$ | $SiO_2 + Al_2O_3 + ZrO_2 + TiO_2$ | C |
|---|---|---|---|---|
| F-1 | 44 | 23 | 10 | 0.12 |
| F-2 | 47 | 21 | 10 | 0.11 |
| F-3 | 42 | 25 | 11 | 0.11 |
| F-4 | 50 | 24 | 15 | — |
| F-5 | 50 | 25 | 15 | — |
| F-6 | 52 | 20 | 10 | — |
| F-7 | 45 | 22 | 9 | 0.12 |
| F-8 | 52 | 24 | 14 | — |

TABLE 3 (b)

| Fluxes | Mn | Si | Cr | Mo | Al | N | Ni | Others |
|---|---|---|---|---|---|---|---|---|
| F-1 | 1.5 | 3.1 | 6.5 | 2.8 | 1.4 | 0.04 | 0.3 | 7.2 |
| F-2 | 1.3 | 3.2 | 6.3 | 2.7 | 0.5 | 0.01 | 0.3 | 7.6 |
| F-3 | 1.2 | 3.0 | 6.5 | 2.8 | — | — | 0.4 | 8.0 |
| F-4 | 2.1 | 4.0 | — | — | — | — | — | 4.9 |
| F-5 | 2.0 | 3.9 | — | — | 1.5 | 0.04 | 0.2 | 2.4 |
| F-6 | 2.4 | 4.1 | 2.3 | — | — | — | — | 9.2 |
| F-7 | 1.3 | 3.2 | 6.4 | 2.7 | 3.8 | 0.1 | 0.3 | 6.1 |
| F-8 | 1.2 | 2.8 | — | — | — | — | — | 6.0 |

N.B. The balance is Fe and inevitable impurities.

TABLE 4

| Experiment No. | W. No. | F. No. | C | Mn | Si | Cr | Mo | Ni | Al | N |
|---|---|---|---|---|---|---|---|---|---|---|
| Example 1 | W-1 | F-1 | 0.11 | 0.75 | 0.28 | 2.14 | 0.97 | 0.20 | 0.023 | 0.030 |
| C. Example 2 | " | F-2 | 0.10 | 0.65 | 0.29 | 2.07 | 0.94 | 0.18 | 0.008 | 0.015 |
| C. Example 3 | " | F-3 | 0.10 | 0.64 | 0.27 | 2.18 | 1.00 | 0.18 | 0.003 | 0.014 |
| C. Example 4 | " | F-7 | 0.09 | 0.67 | 0.30 | 2.13 | 0.96 | 0.16 | 0.062 | 0.055 |
| C. Example 5 | W-2 | F-4 | 0.08 | 0.73 | 0.42 | 1.28 | 0.50 | 0.09 | Tr | 0.014 |
| Example 6 | " | F-5 | 0.07 | 0.70 | 0.41 | 1.29 | 0.51 | 0.10 | 0.020 | 0.025 |
| C. Example 7 | W-3 | F-4 | 0.06 | 0.72 | 0.40 | 2.17 | 0.99 | 0.012 | 0.004 | 0.016 |
| Example 8 | " | F-5 | 0.07 | 0.71 | 0.38 | 2.20 | 1.00 | 0.11 | 0.025 | 0.028 |
| C. Example 9 | " | F-6 | 0.08 | 0.50 | 0.41 | 2.78 | 0.96 | 0.01 | 0.004 | 0.016 |
| Example 10 | W-4 | F-6 | 0.08 | 0.52 | 0.42 | 2.80 | 0.98 | 0.16 | 0.016 | 0.027 |
| C. Example 11 | W-5 | F-4 | 0.07 | 0.78 | 0.38 | 2.26 | 1.01 | 0.16 | 0.020 | 0.015 |
| Example 12 | W-6 | F-8 | 0.10 | 0.78 | 0.30 | 2.25 | 1.03 | 0.18 | 0.005 | 0.028 |

N.B.
(1) The balance is Fe and inevitable impurities.
(2) Work: ASTM A387 Gr. 11 Cl. 2 in Ex. Nos. 5 & 6.
ASTM A387 Gr. 22 Cl. 2 in Ex. Nos. 1–4, 7, 8 & 11–12
ASTM A387 Gr. 21 Cl. 2 in Ex. Nos. 9 & 10.

TABLE 5

| Experiment No. | Tensile strength (kgf/mm$^2$) | Elongation (%) | Charpy Impact Value (kgfm, −30° C.) | | | | | |
|---|---|---|---|---|---|---|---|---|
| | | | As SR* | | | SR + SC* | | |
| Example 1 | 64.0 | 27 | 12.2 | 14.5 | 16.9 | 10.8 | 15.0 | 16.1 |
| C. Example 2 | 62.7 | 30 | 7.4 | 6.5 | 10.2 | 5.8 | 5.5 | 9.7 |
| C. Example 3 | 62.4 | 28 | 4.8 | 6.2 | 2.8 | 4.2 | 1.5 | 3.8 |
| C. Example 4 | 65.9 | 25 | 2.5 | 3.1 | 4.2 | 0.8 | 1.2 | 3.8 |
| C. Example 5 | 62.5 | 27 | 6.2 | 7.4 | 7.6 | 4.8 | 5.2 | 5.5 |
| Example 6 | 63.3 | 28 | 19.2 | 18.6 | 18.8 | 18.8 | 16.4 | 17.5 |
| C. Example 7 | 67.0 | 23 | 2.6 | 3.7 | 4.2 | 2.6 | 0.9 | 1.4 |
| Example 8 | 64.2 | 30 | 14.5 | 16.2 | 15.5 | 13.8 | 14.2 | 15.5 |
| C. Example 9 | 67.3 | 25 | 2.8 | 3.5 | 4.8 | 2.8 | 0.9 | 1.1 |
| Example 10 | 65.8 | 29 | 17.4 | 16.8 | 16.8 | 15.1 | 15.8 | 16.2 |
| C. Example 11 | 66.3 | 26 | 4.2 | 4.8 | 1.4 | 3.8 | 0.9 | 0.8 |

TABLE 5-continued

| Experiment No. | Tensile strength (kgf/mm$^2$) | Elongation (%) | Charpy Impact Value (kgfm, −30° C.) | | | | | |
|---|---|---|---|---|---|---|---|---|
| | | | As SR* | | | SR + SC* | | |
| Example 12 | 63.8 | 28 | 10.1 | 8.8 | 10.1 | 8.6 | 10.1 | 9.5 |

N.B.
As SR: After stress relieving annealing.
AR + SC: After stress relieving annealing and step cooling.

Examples of the invention and comparative examples both gave satisfactory results in tensile strength and elongation, and no distinctive differences were observed therebetween except the Charpy impact value. Namely, the comparative examples were irregular and generally low in the Charpy impact value in the stage immediately after the post weld heat treatment, exhibiting a considerable drop in the Charpy impact value after the temper embrittling heat treatment. In contrast, examples of the present invention all exhibited satisfactory low-temperature notch-toughness, maintaining a high level of the toughness even after the temper embrittling heat treatment.

What is claimed is:

1. A shielded metal arc welding electrode comprising in a core wire or a covering flux thereof the alloy elements C, Mn, Si, Cr, Mo, Al, N, and Ni in the proportions satisfying the following equations:

$$\{B_w \times (C\%)_w\} + \left(\frac{A_f}{1-A_f} \times B_f \times (C\%)_f\right) \leq 0.13\%$$

$$\{B_w \times (Mn\%)_w\} + \left(\frac{A_f}{1-A_f} \times B_f \times (Mn\%)_f\right) \leq 1.0\%$$

$$\{B_w \times (Si\%)_w\} + \left(\frac{A_f}{1-A_f} \times B_f \times (Si\%)_f\right) \leq 0.6\%$$

$$\{B_w \times (Cr\%)_w\} + \left(\frac{A_f}{1-A_f} \times B_f \times (Cr\%)_f\right) = 0.5-3.5\%$$

$$\{B_w \times (Mo\%)_w\} + \left(\frac{A_f}{1-A_f} \times B_f \times (Mo\%)_f\right) = 0.3-1.5\%$$

$$\{B_w \times (Al\%)_w\} + \left(\frac{A_f}{1-A_f} \times B_f \times (Al\%)_f\right) = 0.002-0.04\%$$

$$\{B_w \times (N\%)_w\} + \left(\frac{A_f}{1-A_f} \times B_f \times (N\%)_f\right) = 0.018-0.045\%$$

$$\{B_w \times (Ni\%)_w\} + \left(\frac{A_f}{1-A_f} \times B_f \times (Ni\%)_f\right) \leq 0.3\%$$

wherein $B_w$ is a coefficient of yield in deposited metal of a wire-originating element; $B_f$ is a coefficient of yield in the deposited metal of a flux-originating element; (elemental symbol %)$_w$ is the percentage by weight of a component element of the core wire to be total weight thereof; (elemental symbol %)$_f$ is the percentage by weight of a component element of the flux to the total weight thereof; and $A_f$ is the flux ratio, which is the weight ratio of the applied flux to the total weight of the welding electrode.

2. The shielded arc welding electrode of claim 1, wherein said flux ratio is about 0.23–0.32.

3. The shielded arc welding electrode of claim 1, wherein said yield coefficients $B_w$ and $B_f$ for the wire- and flux-originating alloy elements respectively, are about:

| | $B_w$ | $B_f$ |
|---|---|---|
| C: | 0.5–1.0 | 0.1–0.8 |
| Mn: | 0.2–0.8 | 0.3–0.8 |
| Si: | 0.05–0.4 | 0.1–0.4 |
| Cr: | 0.5–1.0 | 0.5–1.0 |
| Mo: | 0.7–1.0 | 0.7–1.0 |
| Al: | 0.02–0.3 | 0.01–0.1 |
| N: | 1.0–1.7 | 0.3–0.9 |
| Ni: | 0.8–1.0 | 0.7–1.0 |

4. The shielded arc welding electrode of claims 2, 3 or 1, wherein said flux comprises in percentage by weight C≦4.3, Mn≦11.1, Si≦20.0, Cr≦23.3, Mo≦7.1, Al≦13.4, N≦0.5 and Ni≦1.4.

5. The shielded arc welding electrode of claims 2, 3 or 1, wherein said core comprises in percentage by weight C≦0.26, Mn≦5.0, Si≦12.0, Cr≦7.0, Mo≦2.1, Al≦2.0, N≦0.045 and Ni≦0.37.

6. The shielded metal arc welding electrode as in claim 1 which further comprises a content of P, Sb, Sn, and Al each less than 0.01% by weight.

7. The shielded metal arc welding electrode as in claim 1 which further comprises at least one element selected from the group consisting of V, Nb, Ti, and B to improve particularly the high temperature strength.

* * * * *